No. 768,561.

Patented August 23, 1904.

UNITED STATES PATENT OFFICE.

ALPHONSO M. CLOVER, OF ANN ARBOR, MICHIGAN.

ANTISEPTIC COMPOUND.

SPECIFICATION forming part of Letters Patent No. 768,561, dated August 23, 1904.

Application filed September 17, 1903. Serial No. 173,557. (Specimens.)

*To all whom it may concern:*

Be it known that I, ALPHONSO M. CLOVER, a citizen of the United States, residing in Ann Arbor, in the county of Washtenaw and State of Michigan, have invented a certain new and useful Compound to be Used as an Antiseptic and Germicide for Both External and Internal Uses, of which the following is a specification.

My new compound is derived from succinic anhydrid and hydrogen peroxid and may be formed in the following manner: A suitable quantity of pulverized succinic anhydrid is added to a seven or eight per cent. solution of hydrogen peroxid, preferably in the proportion of twenty-five to sixty-five. The mixture is then shaken for about thirty-five minutes at a temperature of about 30° centigrade. The result will be the formation of a precipitate which remains suspended in the solution and which consists of the product in almost pure condition. This may be further purified by recrystallization from a suitable solvent. The precipitate may be removed by filtration and dried in vacuum.

The new substance, which has the formula of $C_8H_{10}O_8$, is formed in very small colorless crystals which have the form of flat plates. It is moderately soluble in water, alcohol, acetone, and acetic ether. It is sparingly soluble in ether, and it is practically insoluble in chloroform and benzene. When the pure substance is heated in a thin-walled glass capillary tube, it begins to soften at about 115° centigrade, and is completely melted at 128° with decomposition and evolution of gas. The substance is an acid as well as a peroxid, and may therefore be designated as succinic peroxid acid. It will combine with basic substances to form salts, which are also germicidal. On account of its high melting-point the substance is very stable, and it may be heated to the boiling-point of water without decomposition. Also if preserved in stoppered bottles it may be kept for months without perceptible decomposition. Thus it is especially adapted for use in warm climates.

The new product is a powerful germicide, its action being many times greater than that of a solution of hydrogen peroxid containing the same amount of active oxygen, the percentage of active oxygen being determined by the well-known method of adding potassium iodid to the acidulated solution and titrating with a standard solution of sodium thio sulfate. The substance is also non-toxic, and may therefore be administered internally with perfect safety.

A water solution of the compound after standing for some time will become hydrolized, resulting in the formation of two compounds, one of which is a new body and forms the subject-matter of another application. Upon further standing the substance is eventually converted into succinic acid and hydrogen peroxid.

What I claim as my invention is—

1. An antiseptic compound derived from succinic anhydrid and hydrogen peroxid which is characterized by the following properties; it is colorless, odorless, and soluble in water; it liberates iodin from an acidulated solution of potassium iodid and in aqueous solution it slowly decomposes into succinic acid and hydrogen peroxid.

2. An antiseptic compound derived from succinic anhydrid and hydrogen peroxid which is characterized by the following properties; it is a colorless crystalline body and is both an acid and a peroxid containing about six and eight-tenths per cent. of active oxygen; it is moderately soluble in water, alcohol, acetone, and acetic ether, it is sparingly soluble in ethyl ether, and it is practically insoluble in chloroform and benzene; when heated it begins to soften at about 115° centigrade and completely melts at about 128° centigrade, with decomposition and evolution of gas chiefly carbon dioxid; when placed in water and agitated the amount initially taken up by the solution is subsequently increased and is doubled in less than half an hour; upon long standing in aqueous solution it is converted into succinic acid and hydrogen peroxid; the substance is a germicide and has its full power immediately upon being dissolved in water.

In testimony whereof I have signed my name to this specification in the presence of two subscribing witnesses.

ALPHONSO M. CLOVER.

In presence of—
CLARE H. BENNETT,
DAVID N. HARPER.